Feb. 6, 1968             J. BLOEMHOF                3,367,289
APPARATUS FOR ADJUSTING ROLLERS FOR DOUGH SHEETING AND MOULDING
Filed May 31, 1966                                  2 Sheets-Sheet 1
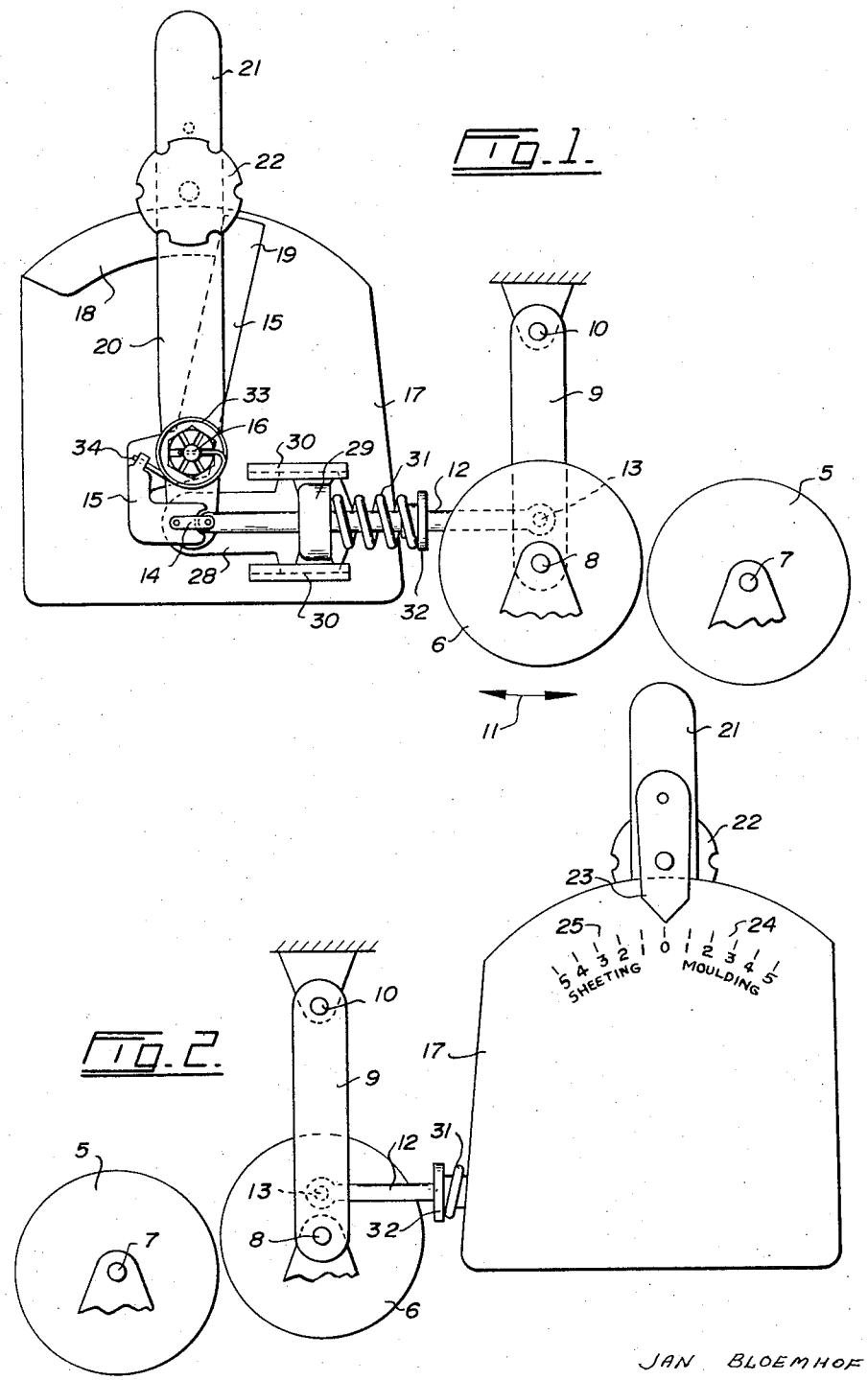
JAN BLOEMHOF
INVENTOR
BY Edward Everly Bishop
ATTORNEY

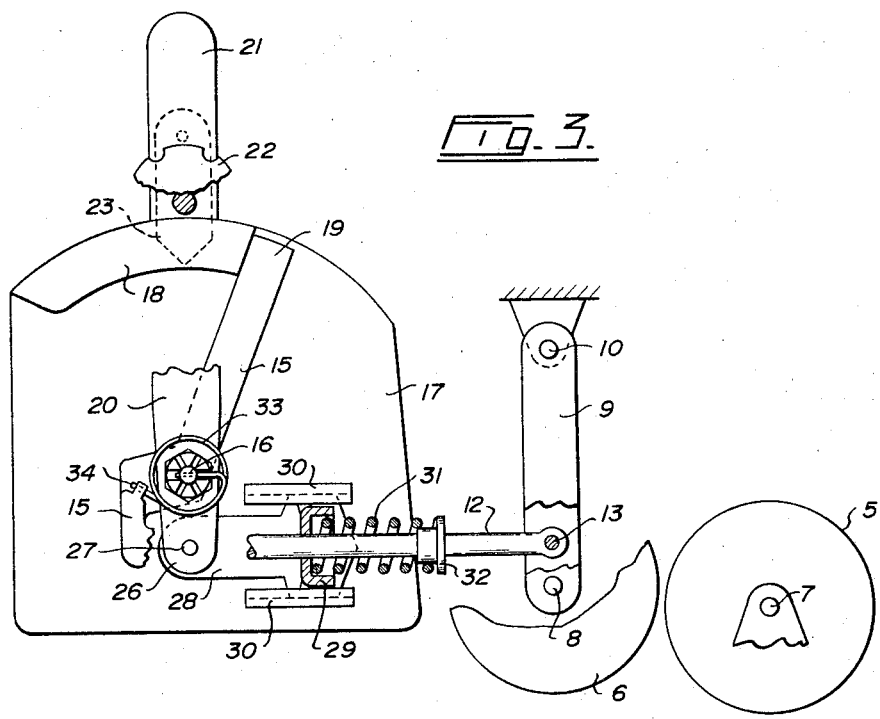

3,367,289
APPARATUS FOR ADJUSTING ROLLERS FOR
DOUGH SHEETING AND MOULDING
Jan Bloemhof, 13336 58th St., Edmonton,
Alberta, Canada
Filed May 31, 1966, Ser. No. 553,886
4 Claims. (Cl. 107—12)

This invention relates generally to apparatus for handling dough of the kind used in bread, pastry and the like and in particular to apparatus for adjusting the spacing of dough shaping rolls. In bread making, it is essential to roll the uncooked dough to remove pockets of air from the dough or to roll out the dough at a certain constant thickness when making other types of pastry.

When rolling dough for use in making bread, it is usual to pass the dough piece between a set of rollers whose peripheral contact is maintained under spring tension so the dough will be squeezed sufficiently to squeeze out pockets of air in the dough.

When rolling dough that is to be used in the manufacture of pastry, it is important that the dough be rolled out to a certain thickness and, for this purpose it is the custom to space the rollers a certain distance apart and to maintain the spacing between the rollers without spring tension.

If the same rollers are to be used for both dough moulding where the rollers are held together under spring tension and dough sheeting where the rollers are spaced apart, it usually is necessary for the baker to make considerable mechanical adjustments to the rollers to convert from one operation to another.

Frequently, this operation is not performed entirely satisfactorily with the result that there is uneven operation or unsatisfactory operation of the rollers for either dough sheeting or moulding.

My invention contemplates the provision of apparatus in combination with a pair of rollers with the apparatus coupled to the rollers so that a simple operation of a lever in one direction will adjust the rollers for dough sheeting and in the opposite direction will adjust the rollers for dough moulding.

The essence of my invention is a rod and lever coupled to one roller in a pair of rollers with spring means in association with the rod and with a second lever coupled to the first lever and adjustable in one direction to actuate the spring and place the rod under pressure. Movement of the lever in the opposite direction then releases the spring and moves the rollers apart.

In drawings illustrating a preferred embodiment:

FIG. 1 is a side elevation of my invention shown coupled to a framework of a roller.

FIG. 2 is a view of the apparatus of FIG. 1 as seen from the opposite side.

FIG. 3 is a view similar to FIG. 1 with portions of the apparatus broken away to illustrate the construction.

With reference now to the drawings, a pair of dough moulding rollers 5 and 6 are mounted on parallel axes 7 and 8 with the axis 7 fixed and the axis 8 attached to the frame 9. The frame 9 is mounted pivotally at 10 so the roller 6 may be moved backwardly and forwardly as indicated by the arrow 11. Dough shaping rollers of this type are more or less conventional in the trade and there would be provided some mechanism to move the roller 6 with relation to the roller 5 for sheeting and moulding.

My improved apparatus for adjusting and controlling movement of the roller 6 consists of the actuating rod 12 connected pivotally at 13 at one end to the frame 9 and connnected pivotally at its opposite end as indicated at 14 to the lower end of the first lever 15. The first lever 15 is mounted pivotally at 16 to the mounting plate 17 and the mounting plate 17 includes the stop 18 which is positioned to restrict movement of the lever 15. The lever 15 is permitted movement in a clockwise direction as viewed in FIG. 1 but is restricted in its anticlockwise movement when its end 19 butts against the stop 18.

A second lever 20 is, in the embodiment illustrated, also mounted pivotally on the pivot 16 to overlie the lever 15. The lever 20 extends at one end past the upper edge of the mounting plate 17 to provide a handle 21 and is provided with a tightening knob 22 which projects through the lever and is in threaded engagement with the pointer 23. The pointer 23 projects over the opposite side of the mounting plate 17 to pinch the edge of the mounting plate between the lever 20 and the pointer 23 when the tightening knob 22 is tightened. A coil spring 33 encircles the pivot 16 and is engaged at one end 34 with the lever 15 to normally urge the lever 15 against the stop 18.

One side of the mounting plate 17 has inscribed thereon a scale which shows on one side indications 24 for dough moulding and on its opposite side indications 25 for dough sheeting. The pointer 23 serves to indicate the various settings in each scale.

At its opposite end 26, the second lever 20 is connected rotatably at 27 to one end of the spring mount 28 which is contained slidably in the slides 30. The mount 28 is formed at its opposite end into a counter-bored socket 29 which will receive one end of the spring 31. The actuating rod 12 passes coaxially through the counter-bored socket 29 with the spring 31 encircling the rod and abutting at its opposite end against the stop 32 fixed to the rod 12.

In operation, and assuming it is wished to set the rolls 5 and 6 for a dough moulding operation, the locking knob 22 is actuated manually to release the lever 20 and the lever 20 then is moved in an anti-clockwise direction to place the pointer 23 at the desired indication on the moulding scale 24. This will move the end 26 of the lever 20 away from engagement with the lever 15 and, at the same time, will transmit movement of the end 26 through the socket 29 to compress the spring 31 against the stop 32. This will place the roll 6 under tension of the spring with the periphery of the roll 6 in contact with the periphery of the roll 5 and when the pointer 23 is moved to the desired indication on the scale the knob 22 may be rotated manually to lock the lever 22 at this point. Thereafter, any movement of the roll 6 away from the roll 5 will be against the pressure exerted by the spring 31.

To set the apparatus for dough sheeting, the lever 21 with the knob 22 released is moved in a clockwise direction to bring the indicator pointer 23 to the desired setting on the sheeting scale 25. Movement of the lever in a clockwise direction will bring the end 26 of the lever into engagement with the end of the lever 15 and move the end 19 of the lever 15 away from the stop 18. This also will pull on the actuating rod 12 and will move the roller 6 away from contact with the roller 5. At the same time the socket 29 will be moved to release tension on the spring 31 and allow the rod 12 to be moved easily in adjusting the roller 6. When the lever 21 has been moved to bring the indicator 23 to the desired indication on the sheeting scale, the knob 22 is again tightened to lock the levers 15 and 20 and the entire mechanism at the desired adjustment position. Thereafter, dough passed between the rollers will be compressed in thickness to the spacing between the rollers 5 and 6 and since the levers 15 and 20 are locked no movement of the roller 6 will take place as the dough passes between the rollers 6 and 5.

What I claim as my invention is:

1. In combination with a pair of dough shaping rolls mounted on parallel shafts, the axis of one shaft being fixed and having a frame connected to the other shaft, such frame being pivotally mounted to allow the spacing between the rolls to be varied, apparatus for adjusting the spacing between the rolls to allow the rolls to be used for both dough moulding and dough sheeting comprising a push rod connected at one end to the pivotally mounted frame, a first lever connected pivotally intermediate its ends and coupled at one end to the other end of the rod, a stop positioned to engage with the opposite end of the first lever to stop movement of the first lever in one direction, a second lever connected pivotally intermediate its ends, means coupling the first and second levers together when the second lever is moved past the stop in the direction opposite to the direction of restricted movement of the first lever and wherein the levers are disengaged when the second lever is moved in the said one direction and the first lever is stopped, spring means coupled at one end to the push rod and at its opposite end to the second lever whereby movement of the second lever in the said one direction with the first lever stopped will increase tension on the spring and wherein movement of the said second lever in the said opposite direction past the stop will decrease the tension on the spring with respect to the rod and means for locking the said second lever when moved to a desired position in either direction.

2. The combination as claimed in claim 1 wherein the first and second levers are pivoted from the same pivot.

3. The combination as claimed in claim 1 and spring means arranged to normally return the first lever to a position against the stop.

4. The combination as claimed in claim 1 and a scale marked to indicate the degree of movement of the said fixed lever.

References Cited

UNITED STATES PATENTS

| | | | |
|---|---|---|---|
| 2,323,907 | 7/1943 | Harriss et al. | 107—12 |
| 2,669,948 | 2/1954 | Naylor | 107—12 |
| 2,737,130 | 3/1956 | Rhodes | 107—12 |

FOREIGN PATENTS 999,324   10/1951   France.

LOUIS O. MAASSEL, *Primary Examiner.*

WALTER A. SCHEEL, *Examiner.*

J. SHEA, *Assistant Examiner.*